United States Patent
Regen et al.

(10) Patent No.: US 9,939,303 B2
(45) Date of Patent: Apr. 10, 2018

(54) DEVICE FOR FLOW MEASUREMENT IN HOSE AND/OR PLASTIC PIPE SYSTEMS

(71) Applicant: Sartorius Stedim Biotech GmbH, Goettingen (DE)

(72) Inventors: Thomas Regen, Goettingen (DE); Sebastian Purmann, Goettingen (DE); Lars Boettcher, Melsungen (DE)

(73) Assignee: Sartorius Stedim Biotech GmbH (DE)

( * ) Notice: Subject to any disclaimer, the term of this patent is extended or adjusted under 35 U.S.C. 154(b) by 246 days.

(21) Appl. No.: 14/649,285

(22) PCT Filed: Sep. 10, 2013

(86) PCT No.: PCT/EP2013/002719
§ 371 (c)(1),
(2) Date: Jun. 3, 2015

(87) PCT Pub. No.: WO2014/086438
PCT Pub. Date: Jun. 12, 2014

(65) Prior Publication Data
US 2015/0300861 A1    Oct. 22, 2015

(30) Foreign Application Priority Data

Dec. 4, 2012  (DE) .................... 10 2012 111 757

(51) Int. Cl.
*G01F 15/00* (2006.01)
*G01F 1/58* (2006.01)
(Continued)

(52) U.S. Cl.
CPC .............. *G01F 15/006* (2013.01); *G01F 1/58* (2013.01); *G01F 1/66* (2013.01); *G01F 1/662* (2013.01); *G01F 15/12* (2013.01)

(58) Field of Classification Search
CPC ... G01F 1/66; G01F 1/58; G01F 1/662; G01F 15/12; G01F 15/006
(Continued)

(56) References Cited

U.S. PATENT DOCUMENTS 4,346,604 A * 8/1982 Snook ...................... G01F 1/58
  73/861.12
6,026,693 A * 2/2000 Baumoel ................. G01F 1/662
  73/861.27
(Continued)

FOREIGN PATENT DOCUMENTS

DE   10 2011 084 171     5/2012
EP        2 508 851     10/2012
(Continued)

OTHER PUBLICATIONS

International Appl. No. PCT/EP2013/002719—English Translation of International Preliminary Report on Patentability dated Jun. 18, 2015.
(Continued)

*Primary Examiner* — Manish S Shah
*Assistant Examiner* — Suman K Nath
(74) *Attorney, Agent, or Firm* — Gerald E. Hespos; Michael J. Porco; Matthew T. Hespos

(57) ABSTRACT

The present invention relates to a device for installation into a hose and/or plastic pipe system and mounting of flow measurement sensors which comprises a plastic flow part as a hollow body with a centrally arranged and deformable region with a rectangular cross section. The present invention further relates to the use of the abovementioned device as well as to a method of flow measurement using the device.

13 Claims, 4 Drawing Sheets

Figure 1:
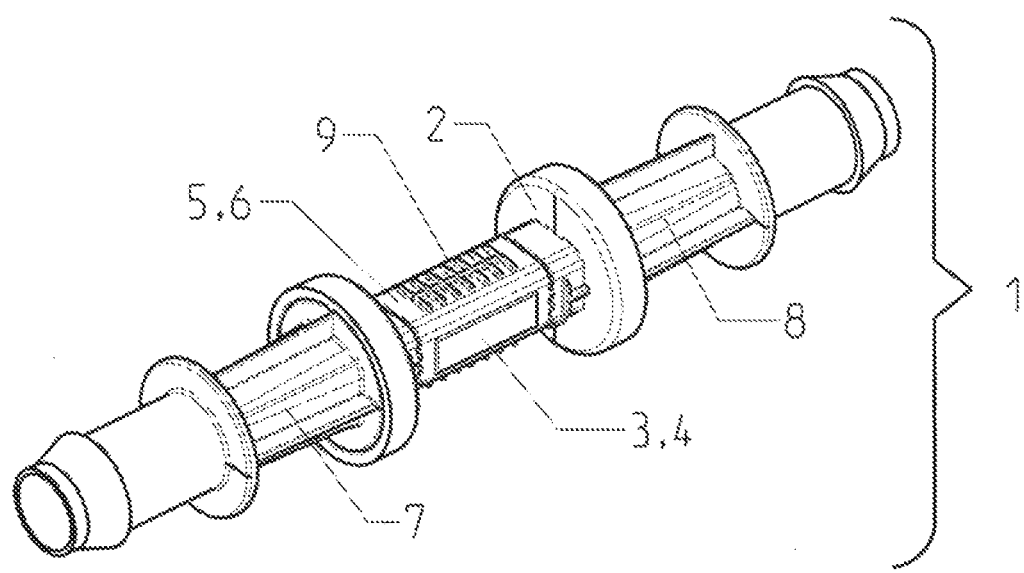

(51) Int. Cl.
*G01F 1/66* (2006.01)
*G01F 15/12* (2006.01)

(58) Field of Classification Search
USPC ........ 73/37, 861.11–861.15, 861.18, 861.22,
73/861.23–861.31, 861.42–861.66,
73/195–202
See application file for complete search history.

(56) References Cited

U.S. PATENT DOCUMENTS

| | | | | |
|---|---|---|---|---|
| 8,464,595 B2* | 6/2013 | Brobeil | ................... | C08G 18/10 |
| | | | | 73/861.11 |
| 2005/0199073 A1* | 9/2005 | Keech | ..................... | G01F 1/588 |
| | | | | 73/861.12 |
| 2006/0052963 A1 | 3/2006 | Shkarlet | | |
| 2012/0318069 A1* | 12/2012 | Murakami | .............. | G01F 1/667 |
| | | | | 73/861.18 |
| 2015/0306789 A1* | 10/2015 | Regen | ................... | B29B 13/024 |
| | | | | 428/36.9 |

FOREIGN PATENT DOCUMENTS

| | | |
|---|---|---|
| JP | 4940384 | 3/2012 |
| WO | 2009/071960 | 6/2009 |

OTHER PUBLICATIONS

International Search Report dated Jan. 29, 2014.

* cited by examiner

DEVICE FOR FLOW MEASUREMENT IN HOSE AND/OR PLASTIC PIPE SYSTEMS

BACKGROUND

1. Field of the Invention

The present invention relates to a device for installation in a hose and/or plastic pipe system and mounting of flow measurement sensors, having a plastic flow part as a hollow body with a centrally arranged and deformable region with a rectangular cross section, with two opposing sensor contact surfaces and two opposing pressure region surfaces being arranged on the outer surface of the centrally arranged region, and two connection regions for connecting to hoses and/or plastic pipes flanking the centrally arranged region. Moreover, the present invention relates to the use of the aforementioned device as well as to a method of flow measurement using the device.

2. Description of the Related Art

Flow measurements are performed in pipe and hose systems in a great number of processes in the automation of industrial or technical laboratory processes. To this end, flow meters are installed in all places in which the current delivery in the pipe or hose network is to be detected or the throughput is to be checked and further processed. Along with temperature, pressure and force, flow measurement constitutes one of the most important variables in industrial metrology and is an essential foundation of process automation.

In automated processes, the flow measurements vary depending on the method of measurement and the medium to be measured. A distinction is made between mechanical/volumetric, thermal, acoustic, magnetic/inductive, optical, gyroscopic or differential pressure/congestion methods. What all of the methods have in common, however, is the recording of certain physical characteristics, e.g., temperature, pressure, sound, acceleration, rotational speed, etc., via a measurement sensor.

In closed pipe or hose line systems, the flow measurements are divided into two subgroups based on medium and output signal, namely volumetric flow and mass flow. Furthermore, depending on the measurement setup, a distinction is made between so-called clamp-on flowmeters from in-line flow measurements. In the in-line flow measurements, the measurement sensors are mounted in the flow profile of the medium to be measured, whereas the clamp-on systems are placed from the outside onto the pipe or the hose and clamped.

Such a clamp-on system is described in JP 04940384 B1. It discloses an ultrasound flowmeter in which a hose through which the fluid to be measured flows is placed into a hinged measuring device and fixed in place by pressing the measuring device together. Through the deformation of the hose, the flow profile of the medium to be measured is altered into a nearly rectangular profile. However, as a result of fluctuations in the density and thickness of the hoses used as well as the resulting fluctuations in the internal cross section, severe measurement inaccuracies can occur when determining the volumetric flow. Both the reproducibility of the measurement results and the calibration of the overall system are thus also greatly impaired. What is more, the hose can bend or twist within the measurement unit during use or kink directly behind the measurement unit, which also leads to measurement inaccuracies.

For rigid pipe systems, a fixed component is known from U.S. Pat. No. 6,026,693 that can be installed into a pipe system via corresponding fittings or flanges. Pairs of ultrasound sensing elements are mounted on the rectangular-shaped component directly behind the flange regions from the outside. The fluid to be measured is changed by the component without transition from a round to an angular flow profile. As a result of the abrupt change from a round to an angular flow profile, turbulent flows are produced that can have a negative influence on the flow measurement. The rigid component is suitable for fixed pipelines having diameters from 2 to 24 inches. As a result of the structural unity of sensors and the actual flow component with a defined cross section, no variance is possible in relation to the sensing element to be connected on the one hand and the pipe diameter on the other hand.

It is therefore the object of the present invention to provide a device for flow measurement that is suitable for use in a plastic hose and/or plastic pipe system while avoiding the abovementioned drawbacks of the prior art. Moreover, it is the object of the present invention to provide a method of flow measurement using such a device.

SUMMARY OF THE INVENTION

Accordingly, the present invention describes a device for installation into a plastic hose and/or plastic pipe system and mounting of flow measurement sensors, having a plastic flow part as a hollow body with a centrally arranged and deformable region with a rectangular cross section, with two opposing sensor contact surfaces and two opposing pressure region surfaces being arranged on the outer surface of the centrally arranged region, and two connection regions for connecting to hoses and/or plastic pipes flanking the centrally arranged region.

The device is embodied such that a sensor cuff or sensor housing can be put in place from the outside. A signal transmission for detecting the flow occurs as soon as the sensor contact surface of the plastic flow part rests over a large surface against the sensor surfaces in the sensor housing. For this purpose, the device is installed in a hose or plastic pipe system by attaching the hoses to the connection regions. The device is then placed with one of the pressure region surfaces pointed downward into a sensor cuff or the sensor housing. As a result of the lid to be closed of the sensor housing or sensor cuff above the second pressure region surface, the plastic flow part in the centrally arranged region experiences a compressive force. This compressive force provides for a slight deformation of the plastic part during which the pressure surface, in a downward motion, provides for a lateral displacement of the sensor contact surfaces in the direction of the sensing element in the sensor cuff. The measurement accuracy is increased by the component in the form of a plastic flow part, since no other deformation of the pipes or hoses connected thereto in which the measured fluid flows is necessary. In addition, an elastic or partially elastic contacting means, e.g., in the form of a silicone layer or a silicone casing, can be provided around the centrally arranged region (preferably fixed to the plastic flow part, particularly connected or molded onto the sensor contact surface(s)). The contacting means can be arranged in whole or in part around the centrally arranged region, e.g., only in the region of the sensor contact surfaces. Moreover, additional means (such as a contact gel) for establishing contact between sensor contact surfaces and the actual sensors can be omitted for the most part.

In this context, the term "deformable" more specifically defines the material of the centrally arranged region of the plastic flow part. In this region, the material can be deformed in such a way that a deformation of the region occurs through the pressure transmitter from the outside—for example, the lid of the sensor cuff—so that the sensor contact surfaces rest against the sensing elements in the sensor cuff. The sensor contact surfaces need not rest 100% against the sensing element, but need only have a minimum contact surface with the sensing element required for the measurement. The minimum contact surface depends on the type and arrangement of the sensors for which the plastic flow part is designed. Generally, however, a minimum contact is achieved in which additional aids such as contact gel can be omitted. The deformation is small in scale and many times smaller than in the clamp-on hose systems, in which the hoses are pressed into a rectangular cross section. Depending on the plastic material selected, however, the deformation can also be an elastic or partially elastic deformation. The deformation is preferably brought about by mechanical pressurization, for example by manually closing the sensor lid. Other possibilities for [generating] pressure for the deformation of the plastic flow part depend on the type and shape of the sensing element to be mounted. Besides a mechanically exerted compressive force, a pneumatic actuation is also conceivable, for example.

In relation to the shape of the hollow body in the centrally arranged region, the term "rectangular" is understood to be a substantially rectangular shape that can, however, have slight chamfers or roundings. Depending on the deformability and the plastic material selected, there can be slight deviations in the rectangular shape. However, the basic shape of the centrally arranged region remains rectangular or even square.

As a result of tolerances in the manufacture of plastic parts and in the manufacture of sensor housings or cuffs, i.e., due to the spacing of the sensors with respect to each other associated therewith, it can occur in the prior art that the sensor contact surfaces of the plastic part and the sensing elements do not contact each other in the cuff. In the present invention, the deformability of the component ensures optimum contact between sensor contact surfaces and the sensors and thus also an optimum signal transmission. Moreover, other aids for signal transmission, such as contact gel, can be omitted for the most part, since they result in, among other things, a contamination of the sensor housing, thus rendering operation less pleasant and more laborious.

In one of the embodiments, in order to go from a round flow profile in the connected plastic pipes or plastic hoses to an angular flow profile in the centrally arranged region of the device, the internal cross section in the connection regions transitions from a round to an angular cross section. The path in the connection regions runs rectilinearly to the centrally arranged region. As a result, influences on the flow, such as Coriolis force, and resulting measurement inaccuracies are prevented.

The length of the transitional regions depends on the diameter of the connected pipes or hoses as well as the size and the exact cross section of the desired measuring zone in the middle part. The measuring zone can vary depending on the measurement principle and the arrangement of the individual sensors. The connection regions are dimensioned according to the method of measurement used and the associated number and arrangement of the sensors. The transition from the round to the angular internal cross section occurs in such a way that turbulent flows or a breakaway of the flow of the fluid to be measured are prevented.

In another embodiment of the device, the pressure region surfaces and the sensor contact surfaces of the centrally arranged region are interconnected by thin areas, preferably film hinges or articulations, or by means of a multi-component plastic system.

Additional flexibility with respect to the deformability in the centrally arranged region of the device is achieved through the thin areas. In this way, an undesired lens effect can be avoided when the sensor contact surfaces are displaced laterally, i.e., the rectangular cross section remains intact despite the compression of the centrally arranged region. Moreover, the thin areas enable an even more targeted regulation of the deformation of the device material. Film hinges, which are known as such from the area of plastic packaging, for example in soap bottles with a foldable lid, are particularly expedient in this respect. In the present invention, the resulting flexibility was exploited to achieve directed deformability of the plastic material in order to support the form-fitting deformation of the sensor contact surfaces to the sensor. Depending on the plastic material selected, both film hinges or articulations and systems comprising several plastics are used as thin areas. In the multi-component systems, a material is used for this purpose in the desired thin areas that is relatively softer than the plastic used for the rest of the device.

In another embodiment of the device, the sensor contact surfaces have flat outer surfaces.

The flat outer surfaces enable a contact surface to the sensing element with the sensors contained therein that is as large as possible. The surfaces are designed as a function of the method of measurement and the associated arrangement of the sensors. An ultrasound flow meter measures the flow velocity in the measurement section by means of two opposing sensor arrangements. The sensors are arranged at an angle to each other such that one sensor is arranged somewhat farther downstream than the other. The flow signal is determined through alternating measurement of the travel time of an acoustic signal from one sensor to the other, thereby exploiting the effect that sound is transmitted more quickly in the direction of flow than against the direction of flow. The volumetric flow is thus determined through sequential measurement between all of the sensor pairs in the arrangement.

To further increase the measurement accuracy, the sensor contact surfaces are arranged parallel to one another in one of the embodiments. In this way, the sensor contact surfaces are adapted in as form-fitting a manner as possible to the sensors in the sensing element, particularly in clamp-on measurement systems.

The pressure region surfaces each border the sensor contact surfaces at about a right angle and define two other sides of the centrally arranged region of the device. In one of the embodiments, the pressure region surfaces have profiles as contact surfaces for a flowmeter to be closed by pressure around same.

The profiles are used to ensure a uniform distribution of pressure. Moreover, the profiles increase the adhesion for the respective pressure transmitter. However, the shape of the profiles also depends on the manufacture of the plastic part. For instance, a ribbed structure can be produced especially well in an injection molding process. At the same time, the ribbed structure offers the advantage that the pressure can be distributed optimally over the entire surface via the long middle rib and the adjacent transverse ribs. Other embodiments of the profiles are also feasible, however.

As already mentioned, the pressure exerted on the pressure region surfaces can be produced mechanically, e.g., through manual actuation, or pneumatically. Depending on the sensing element and its use, the profiles are placed and shaped against or on the pressure region surfaces of the device.

In another embodiment of the device, the plastic flow part is composed of up to three individual components, comprising the centrally arranged region and the two connection regions flanking the centrally arranged region.

Flexibility with respect to the use of the device is thus increased. The connection regions are dimensioned according to the hoses or pipes to be connected, and the centrally arranged region can be replaced accordingly depending on the method of measurement, provided that the diameter is adapted here as well to the connection regions and the expected volumetric flow. In one preferred embodiment, the cross-sectional surface of the connected hose or plastic pipe is equal to the internal cross-sectional surface of the plastic flow part. Moreover, a multi-part device makes flexible manufacture possible, since the release properties are especially well-suited to manufacturing using the injection molding process, for example. A slight conicity of the hollow spaces is associated with this type of manufacture. What is more, asymmetrical shapes can also be implemented in a multi-part embodiment of the plastic flow part. This is advantageous, for example, if one wishes to change from a large to a small hose diameter over the travel path of the component or predetermine the direction of flow with the shape. Moreover, the individual components can have different colors in order to facilitate handling during assembly, for example.

In the embodiment composed of up to three individual components, said components are interconnected thermally, preferably by welding or hot embossing methods, by adhesion, preferably by adhesive or insert molding methods, or mechanically, preferably by screwing.

The advantages of the multi-part construction described previously result in a form-fitting joining of the individual parts into the final device. Different methods have proven expedient for this purpose which can be categorized as thermal, adhesive or mechanical joining methods, depending on the plastic selected. In the thermal methods, especially the standard plastic welding methods are applied, i.e., hot-tool welding, ultrasound welding, laser welding, induction welding or vibration welding. The abovementioned welding methods are substance-to-substance joining methods in which the plastic is plasticized. Only thermoplasts are suited to the welding methods, since only they are capable of forming melts. In hot-tool welding, the individual parts are melted at the contact points separately from each other by means of heating elements and then adhered together. This results in a very strong and hermetically sealed connection that is free of additional joining means such as adhesives, for example. Additional adhesives are often undesirable in this context, since they can break down later during operation and components may make their way into the device, thus possibly contaminating the product. Nonetheless, adhesive methods offer advantages depending on the plastic, for example if the plastic cannot withstand a thermal load. In the insert molding methods, additional material is introduced just like with the adhesive methods, and the individual components are enclosed or encased at the corresponding areas of connection either with the same plastic or with a material different from the material of the actual device. In the case of a mechanical connection, screw threads, coupling pieces or the like are provided on the individual components. It is also possible to simply stick them together and additionally fix them in place with the aid of hose clamps.

In another embodiment of the device, the plastic flow part is manufactured in an injection molding method, preferably a multi-component injection molding method, through extrusion, through mechanical processing of a plastic blank, preferably by turning and/or milling, or through a prototyping method, selected from the group of vacuum pressure injection methods, 3D printing methods, laser sintering or stereolithography.

Here, too, the selection of the method depends substantially on the selection of the plastic to be used, since not every plastic is equally suited to every manufacturing method. The selection of the plastic, in turn, depends greatly on the application. The individual load parameters in terms of pressure, temperature, mechanical loading, resistance to media, sterilizability and suitability for certain applications in the area of pharmaceuticals or medicine, for example, play a crucial role here.

In one special embodiment, the plastic flow part is made from a thermoplast selected from the group of polyethylene (PE), high-density polyethylene (HDPE), polypropylene (PP), polyvinylchloride (PVC), polycarbonate (PC), copolyester, acrylonitrile butadiene styrene copolymer (ABS) or styrene acrylonitrile (SAN); an elastomer selected from the group of ethylene propylene diene monomer (EPDM) and liquid silicone (LSR); a thermoplastic elastomer (TPE), preferably based on urethane or as a styrene block copolymer; a multi-component plastic selected from a mixture of polyethylene (PE) and polypropylene (PP), polypropylene (PP) and a thermoplastic elastomer, polycarbonate and a thermoplastic elastomer, and acrylonitrile butadiene styrene copolymer (ABS) and polypropylene (PP).

As already described previously, the selection of the plastic depends both on the desired application of the device and on the costs of its method of manufacture. In one special embodiment, the device is conceived as a disposable item, so that the known thermoplasts polyethylene or polypropylene are used for such applications for cost-related reasons. In the multi-component plastics, different material properties can be combined with each other; for example, increased deformability can be achieved through combination with a thermoplastic elastomer.

In another embodiment, the device withstands an operational pressure of ≤6 bar, preferably ≤5 bar, and a safety pressure of ≤7 bar, preferably ≤8 bar.

The operating pressure thus also has an influence on the dimensioning of the overall device. The specific designing of the device is thus undertaken as a function of the operating pressure, but also the operating temperature, the duration of the load (time of operation) and the specific material characteristics. Moreover, the design of the device also depends on the fluid to be measured and its specific characteristics. It can involve pure liquids, liquids with gas inclusions, i.e., dissolved gases or gas bubbles, or even liquid-solid systems such as diatomite filter particles in a carrier fluid.

As already mentioned above, the device is therefore designed such that it withstands a temperature from 5 to 50° C., preferably 10 to 37° C., especially preferably 15 to 25° C.

These temperature ranges are, for one, compatible with the use of plastic and, for another, adapted to the applications of the device, particularly in the biopharmaceutical, foodstuff technology or chemical area. During the production of biopharmaceuticals, the temperature range depends on the cultured organisms and their temperature profile as well as the biochemical products, e.g., proteins and their temperature profile. The device is adapted to these temperature profiles accordingly.

In another embodiment of the device, the connection regions are adapted to hose and/or plastic pipe internal diameters from 1/8" to 2", preferably 1/4" to 1". For pipe and hose diameters, the unit of measure of " continues to be the standard for a person skilled in the art. 1" (inch) corresponds to 1 in (inch) which, in turn, corresponds to 25.4 mm. These are also the common hose and plastic pipe diameters that are used as disposable (single-use) articles in the pharmaceutical, chemical or foodstuff technology industry as well as in technical laboratories.

In another embodiment of the device, it is therefore a disposable article. Due to the high sterility requirements, so-called "single-use" products are being used more and more for production, particularly in the area of pharmaceuticals, in medicine, as well as in the foodstuffs sector. The device described herein makes another building block available for an automated production process which uses a single-use system. In order to minimize or even completely rule out contamination, the present device is not intended for installation on site; rather, it is particularly used as a building block in a closed disposable fluid system. For example, the device for flow measurement can be mounted on a disposable bioreactor from which the culture medium is transferred together with the target product after fermentation to another container for further storage or work-up. The entire fluid system, which is connected via sterile membranes to the inlets and outlets, is packaged and sterilized, and the device is thus delivered to the end user as a component of the overall package. After production, the complete package can be disposed of accordingly.

In another embodiment of the device, at least one elastic or partially elastic contacting means is provided on at least areas of the centrally arranged region. In this way, any manufacturing tolerances of elements (e.g., of the sensing element) can reliably be compensated for. What is more, depending on the measurement principle, the signal transmission is improved by the contacting means. Besides silicone, the following thermoplastically deformable plastics are suitable for the contacting means, for example: polyolefins, polyvinylidene fluoride, fluororubber, polyvinylchloride or polytetrafluoroethene.

As has already been demonstrated, the applications are extremely varied and are generally aimed at the previously discussed branch of industry. In another aspect of the present invention, the device is thus used in hose and/or plastic pipe systems, preferably fluid systems, especially preferably liquid systems, for flow measurement in automated industrial or technical laboratory processes; preferably medical, biotechnical or foodstuff technology processes.

Another aspect of the present invention thus relates to a method of flow measurement which is characterized by the following method steps:
 a) Provision of a device having a plastic flow part as a hollow body with a centrally arranged and deformable region with a rectangular cross section, with two opposing sensor contact surfaces and two opposing pressure region surfaces being arranged on the outer surface of the centrally arranged region, and two connection regions flanking the centrally arranged region,
 b) Connection of the device from step a) to a hose and/or plastic pipe system as well as associated supply vessels via the connection regions to form a closed system,
 c) Placement of the centrally arranged region into a flowmeter having a sensing element with at least one pair of sensors and a lid for clamping the flowmeter, the plastic flow part being arranged with the sensor contact surfaces in the flowmeter such that at least one pair of sensors is facing toward the sensor contact surfaces of the plastic flow part and the lid lies above one of the pressure region surfaces,
 d) Pressing of the sensor contact surfaces in the direction of the pair of sensors of the flowmeter through deformation of the plastic flow part through manual pressing of the lid over the pressure region surface, and
 e) Connection of the flowmeter to a measuring transducer with evaluation unit and execution of the flow measurement.

With the present method and the present device, it is possible for the first time to perform a precise flow measurement in hose and plastic pipe systems without the need to deform the hoses or pipes directly for the measurement, which is associated with increased calibration work. In the present method, however, no subsequent calibration is necessary, since a defined measuring zone is created through the use of a molded plastic flow part. The measurement results are thus rendered reproducible and the measurement as such more precise, since the described device above leads to a precise geometry and material distribution in the measuring zone. For this purpose, the device described above is made available in step a). This is connected in step b) via the connection regions to the hose or plastic pipe systems. "Connect" is understood here as being any type of connection of the device according to the invention and the hoses or pipes. For example, the hoses can be pushed up onto the connection regions and fixed using hose clamps. In the case of plastic pipes, screw threads, couplings or connection clamps by means of which a connection is established could also be provided. Step c) entails the actual measurement arrangement of the device, which is enclosed by a flowmeter, the flowmeter having a lid that is closed over the pressure region surfaces, for example with manual pressure. Through the closing of the lid in step d), the sensor contact surfaces are pressed outward and thus moved in the direction of the sensors that are located in the sensing element. Any different dimensions (those caused by manufacturing tolerances, for example) can be substantially compensated for particularly through the deformation of the plastic flow part (e.g., of the deformable region and/or of an elastic or partially elastic contacting means mounted thereon or at least partially thereon). By virtue of this simple handling, there is generally no need for an additional contacting means, e.g., contact gel, whereby the cleaning work is also spared. Subsequently, the flowmeter can be connected to a measuring transducer with evaluation unit for the execution of the flow measurement (step e).

In one embodiment of the method, a sterilization of the closed system produced in step b) takes place between steps b) and c), the sterilization being selected from the group of radiation sterilization, preferably gamma radiation sterilization or electron radiation sterilization, hot steam sterilization and gas sterilization.

The type of sterilization depends on the overall system that is connected and the degree of sterilization desired for the application. In the disposable complete solutions described above, the entire package of sterile containers, hoses or pipes and flow measurement device is packaged and then sterilized according to one of the abovementioned methods, e.g., by means of gamma sterilization.

In a preferred embodiment of the method, the actual flow measurement is performed as a volumetric flow measurement, preferably ultrasound flow measurement (USD) or magnetic-inductive flow measurement (MID).

Ultrasound flow meters (USD) measure the velocity of the flowing medium with the aid of acoustic waves and consist of two parts: the actual sensing element (ultrasound sensor) and an evaluation and power supply part (transmitter or measuring transducer). As an acoustic method of measurement, it offers several advantages over other methods. The measurement is largely independent of the characteristics of the media used, such as electrical conductivity, density, temperature and viscosity. The lack of moving mechanical parts reduces the maintenance work, and no pressure loss occurs as a result of cross-sectional narrowing. A large measuring zone is among the other positive characteristics of this method.

Another contactless measurement principle is magnetic-inductive flow measurement (MID). The measurement principle of these flow meters exploits the separation of moving charges in a magnetic field. The liquid, which must have a minimum conductivity, flows through the pipe or the hose. A magnetic field that is oriented perpendicular to the direction of flow is applied from the outside by means of coils. The charge carriers, ions or charged particles present in the conductive liquid are diverted by the magnetic field. As a result of the charge separation, voltage occurs at the measuring electrodes arranged perpendicular to the magnetic field that is detected with an evaluation unit. The level of the measured voltage is proportional to the flow velocity of the charge carriers.

Additional embodiments of the invention follow from the exemplary embodiment and the drawings, which do not limit the present invention in any way, however, as they are intended merely to illustrate concrete embodiments.

EXEMPLARY EMBODIMENT: DIMENSIONING OF THE PLASTIC FLOW PART

The dimensioning of the plastic flow part 1 depends on many different factors, all of which are in certain relationships with each other, however. The exemplary embodiment described here is based on a clamp-on ultrasound flow measurement method provided for this purpose in which two pairs of sensors (not shown) are arranged in the sensing element. The plastic flow part 1 is placed into the ultrasound sensing element 10 and fixed through the closing of the lid 11 above a pressure region surface 5, 6.

The width of the centrally arranged, deformable region 2 is predetermined by the sensor sizes, since the contact between sensor contact surfaces 3, 4 and the sensors must be ensured. The height of the sensor contact surfaces 3, 4 is defined by the sensing element 10 and the number and arrangement of the sensors associated therewith. Accordingly, the sensor contact surfaces 3, 4 must lie in the area of the field of measurement. The area in which the wall thickness of the sensor contact surfaces 3, 4 in the centrally arranged region 2 can vary is also predetermined by the sensing element 10. A limit is imposed on the wall thickness by the pressure resistance that is required. The strength required for this depends on the load, i.e., the operating pressure, the temperature, the duration of the load and the material characteristics. The plastic is high-density polyethylene (HDPE) in this case.

In the example depicted here, thin areas, preferably film hinges, are also provided whose wall thickness is put in a suitable ratio to the wall thickness of the side surfaces (sensor contact surfaces 3, 4 and pressure region surfaces 7, 8) on the basis of calculations according to the finite element method. The deformation to be expected can be evaluated beforehand on the basis of FEM calculations. According to the calculations, in the event of a lateral displacement of the sensor contact surfaces 3, 4 by 0.2 mm, a deformation of the upper and lower pressure region surfaces 5, 6 of 0.5 mm is necessary with a constant quadratic internal cross section. The quadratic internal cross section prevents the effect of an acoustic lens. A lens-like deformation of the sensor contact surfaces 3, 4 is prevented by the film hinges.

On the basis of the described dimensioning and the ultrasound measuring devices used in this example, one obtains wall thicknesses in the range from $\frac{1}{16}$ mm to $\frac{3}{32}$ mm for the sensor contact surfaces 3, 4 in the centrally arranged region 2. In the case of larger sensors, the wall thickness also increases.

FIGURES

FIG. 1 is a perspective overall illustration of the plastic flow part 1 from the outside. The centrally arranged, deformable region 2 is flanked by the connection regions 7 and 8 onto whose outer ends hoses can be pushed up. The round internal cross section of the connection regions 7, 8 can be seen in the area of the connection regions 7, 8. One of the pressure region surfaces 5, 6 can be seen on the centrally arranged region 2 with a corresponding profile 9. The pressure region surfaces 5, 6 oppose each other. One of the two flat sensor contact surfaces 3, 4 is disposed at a right angle with respect thereto which also oppose each other.

Figure 2:
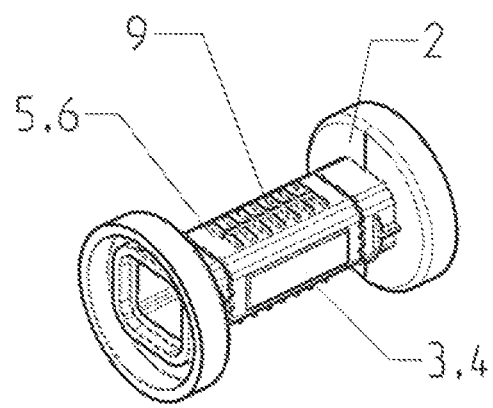

FIG. 2 is a perspective representation of the centrally arranged region 2 with one of the pressure region surfaces 5, 6 and the profile 9 as well as the sensor contact surfaces 3, 4. In this illustration, the nearly quadratic internal cross section of the device can be seen at the head end of the centrally arranged region 2.

Figure 3:
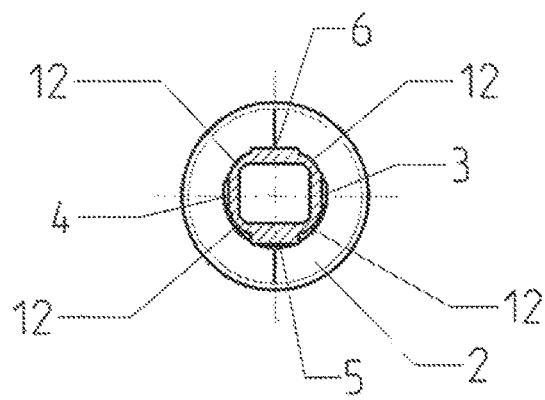

FIG. 3 shows a cross section through the centrally arranged region 2 with the thin areas 12 between the pressure region surfaces 5, 6 and the sensor contact surfaces 3, 4. As a result, the measurement chamber created by the perpendicular arrangement of the pressure region surfaces with respect to the sensor contact surfaces is substantially rectangular.

Figure 4:
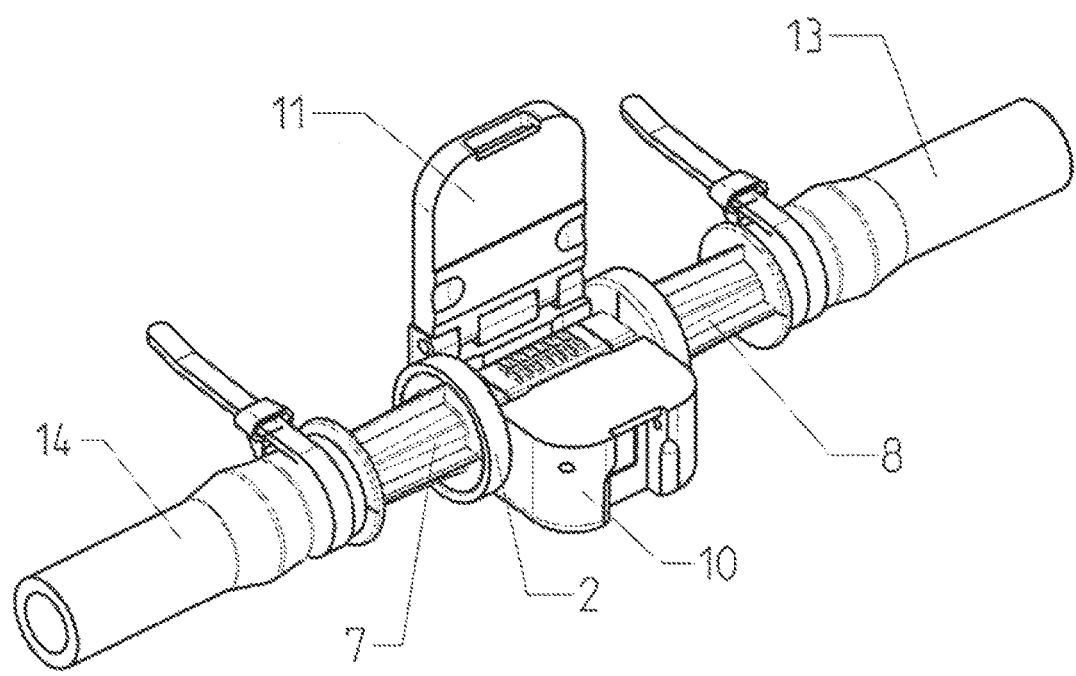

FIG. 4 is a perspective representation of the plastic flow part 1 complete with connected hoses and sensing elements 10. The hoses 13, 14 are pushed up onto the connection regions 7, 8 and respectively fixed with a hose clamp. Moreover, the centrally arranged region 2 of the plastic flow part 1 is placed with the laterally arranged sensor contact surfaces 3, 4 into a sensing element 10. Accordingly, the pressure region surfaces 5, 6 lie above (visible) and below (not visible) in the sensing element 10. The lid 11 can thus be closed via one of the pressure region surfaces 5, 6.

Figure 5:
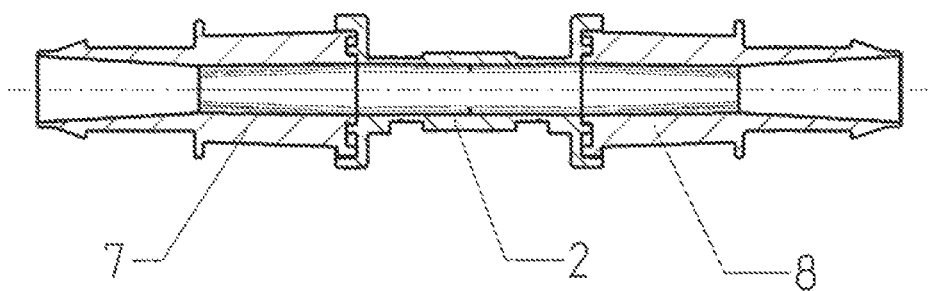

FIG. 5 shows a longitudinal section through the entire plastic flow part 1 in a three-part construction with the centrally arranged region 2 and the connection regions 7, 8. The inlet path of the fluid medium can be seen through the section. The flow profile is thus successively converted from a round to an angular flow profile, whereby turbulences can be prevented. The slight conicity over the entire length of travel is produced during the three-part manufacture in the injection molding method.

Figure 6:
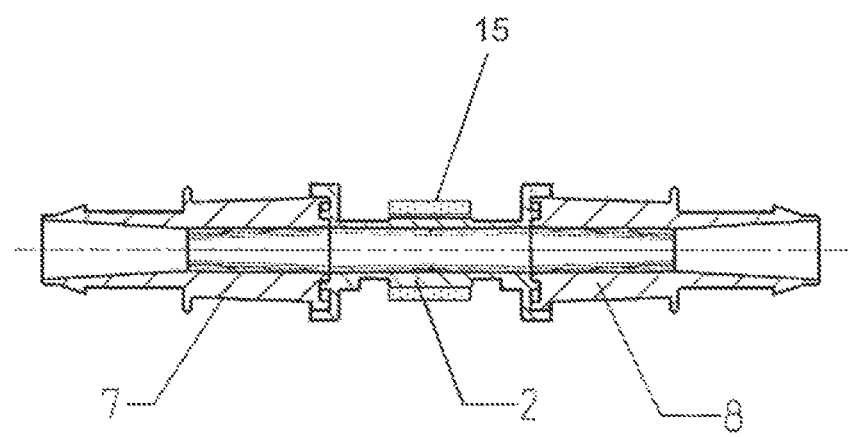

FIG. 6 shows a longitudinal section through another embodiment of the plastic flow part 1 in a three-part construction with the centrally arranged region 2 and the connection regions 7, 8. In this embodiment, the centrally arranged region 2 additionally comprises an elastic or partially elastic contacting means 15. Preferably, the elastic or partially elastic contacting means 15 encloses the centrally arranged region 2 at least in the area of the sensor contact surfaces 3, 4 and the pressure region surfaces 5, 6. However, the contacting means can also be arranged only on the sensor contact surfaces 3, 4 and/or the pressure region surfaces 5, 6. The elastic or partially elastic contacting means 15 is made at least in part of a material that is more flexible and softer than the material of the centrally arranged region 2. Furthermore, the material of the elastic or partially elastic contacting means 15 is suited to transmitting sound waves of the sensing element and coupling them into the fluid medium via the pressure region surfaces 5, 6. Preferably, silicone is used as a material for the contacting means 15. The elastic or partially elastic contacting means 15 can be connected to the centrally arranged region 2 (preferably in a fixed manner) or molded thereon by means of insert molding, adhesion or welding. It is particularly the task of the elastic or partially elastic contacting means 15 to compensate for manufacturing tolerances of the sensing element and/or to ensure that the sound waves can be coupled reliably and uniformly via the pressure region surfaces 5, 6 into the fluid medium and can be reliably detected via the sensor contact surfaces 3, 4.

LIST OF REFERENCE SYMBOLS 1 plastic flow part
2 centrally arranged region
3 sensor contact surface
4 sensor contact surface
5 pressure region surface
6 pressure region surface
7 connection region
8 connection region
9 profile
10 sensing element
11 lid
12 thin areas
13 hose
14 hose
15 contacting means

The invention claimed is:

1. A device for installation into a plastic hose and/or plastic pipe system and mounting of flow measurement sensors, comprising;
   a plastic flow part (1) defining a hollow body extending in a longitudinal direction and having two connection regions (7, 8) for connecting to hoses and/or plastic pipes on opposite ends thereof, a centrally arranged and deformable region (2) of rectangular cross section arranged centrally between the two connection regions (7, 8) and formed of a first material, two opposing sensor contact surfaces (3, 4) and two opposing pressure region surfaces (5, 6) being arranged on outer surface areas of the centrally arranged region (2), and at least one elastic or partially elastic contacting means (15) provided at least in areas of the centrally arranged region (2) and formed of a second material that is more flexible and softer than the first material.

2. The device of claim 1, further comprising internal cross section transitions in the connection regions (7, 8) from a round cross section to the rectangular cross section.

3. The device of claim 1, wherein the pressure region surfaces (5, 6) and the sensor contact surfaces (3, 4) of the centrally arranged region (2) are interconnected via film hinges, articulations or via a multi-component plastic system.

4. The device of claim 1, wherein the sensor contact surfaces (3, 4) have flat outer surfaces.

5. The device of claim 1, wherein the sensor contact surfaces (3, 4) are parallel to each other.

6. The device of claim 1, wherein the pressure region surfaces (5, 6) have contact surfaces for a flowmeter to be closed by pressure around the pressure region surfaces (5, 6).

7. The device of claim 1, wherein the centrally arranged region (2) and the connection regions (7, 8) are interconnected thermally, by adhesion or mechanically.

8. The device of claim 1, wherein the plastic flow part (1) is manufactured by injection molding, extrusion, turning and/or milling, vacuum pressure injection, 3D printing, laser sintering or stereolithography.

9. The device of claim 1, wherein the plastic flow part is made from a thermoplast selected from the group of polyethylene (PE), high-density polyethylene (HDPE), polypropylene (PP), polyvinylchloride (PVC), polycarbonate (PC), copolyester, acrylonitrile butadiene styrene copolymer (ABS) or styrene acrylonitrile (SAN); an elastomer selected from the group of ethylene propylene diene monomer (EPDM) and liquid silicone (LSR); a thermoplastic elastomer (TPE), preferably based on urethane or as a styrene block copolymer; a multi-component plastic selected from a mixture of polyethylene (PE) and polypropylene (PP), polypropylene (PP) and a thermoplastic elastomer, polycarbonate and a thermoplastic elastomer, and acrylonitrile butadiene styrene copolymer (ABS) and polypropylene (PP).

10. The device of claim 1, wherein the device withstands an operating pressure of ≤6 bar and a safety pressure of ≤7 bar.

11. The device of claim 1, wherein the device withstands a temperature from 5 to 50° C.

12. The device of claim 1, wherein the connection regions (7, 8) are adapted to hose and/or plastic pipe internal diameters from ⅛" to 2".

13. A device for installation into a plastic hose and/or plastic pipe system and mounting of ultrasound flow measurement sensors, comprising:
   a plastic flow part (1) defining a hollow body extending in a longitudinal direction and having two connection regions (7, 8) for connecting to hoses and/or plastic pipes on opposite ends thereof, a centrally arranged and deformable region (2) of rectangular cross section arranged centrally between the two connection regions (7, 8) and formed of a first material, two opposing sensor contact surfaces (3, 4) and two opposing pressure region surfaces (5, 6) being arranged on outer surface areas of the centrally arranged region (2), and at least one elastic or partially elastic contacting means (15) provided at least in areas of the centrally arranged region (2) and formed of a second material that is more flexible and softer than the first material.

\* \* \* \* \*